(12) United States Patent
Manwaring et al.

(10) Patent No.: US 7,510,213 B2
(45) Date of Patent: Mar. 31, 2009

(54) ADAPTIVE ENERGY ABSORBER FOR STEERING COLUMN

(75) Inventors: Marvin V. Manwaring, Clio, MI (US); Richard K. Riefe, Saginaw, MI (US); Ravi Ravindra, Saginaw, MI (US); Timothy W. Kaufmann, Frankenmuth, MI (US); Ratko Menjak, Frankenmuth, MI (US); Albert C. Huber, Montrose, MI (US)

(73) Assignee: Delphi Technologies, Inc., Troy, MI (US)

( * ) Notice: Subject to any disclaimer, the term of this patent is extended or adjusted under 35 U.S.C. 154(b) by 193 days.

(21) Appl. No.: 11/430,372

(22) Filed: May 9, 2006

(65) Prior Publication Data

US 2006/0273569 A1 Dec. 7, 2006

Related U.S. Application Data

(60) Provisional application No. 60/686,472, filed on Jun. 1, 2005.

(51) Int. Cl.
*B60D 1/11* (2006.01)

(52) U.S. Cl. ....................................................... 280/777
(58) Field of Classification Search ................. 280/775, 280/777; 74/492, 493; 188/371, 374
See application file for complete search history.

(56) References Cited

U.S. PATENT DOCUMENTS

| | | | |
|---|---|---|---|
| 5,605,352 A | 2/1997 | Riefe et al. | |
| 5,720,496 A | 2/1998 | Riefe et al. | |
| 6,170,874 B1 | 1/2001 | Fosse | |
| 6,189,929 B1 | 2/2001 | Struble et al. | |
| 6,322,103 B1 | 11/2001 | Li et al. | |
| 6,367,840 B1 * | 4/2002 | Duval et al. | 280/777 |
| 6,450,532 B1 | 9/2002 | Ryne et al. | |
| 6,652,002 B2 | 11/2003 | Li et al. | |
| 6,655,716 B2 * | 12/2003 | Riefe | 280/777 |
| 6,659,504 B2 | 12/2003 | Riefe et al. | |
| 6,749,222 B2 | 6/2004 | Manwaring et al. | |
| 6,761,376 B2 | 7/2004 | Riefe et al. | |
| 6,802,536 B2 | 10/2004 | Li et al. | |
| 6,877,775 B2 | 4/2005 | Manwaring et al. | |
| 2003/0075405 A1 * | 4/2003 | Manwaring et al. | 188/371 |
| 2004/0232685 A1 * | 11/2004 | Gatti et al. | 280/777 |

* cited by examiner

*Primary Examiner*—John Q. Nguyen
*Assistant Examiner*—Robert A. Coker
(74) *Attorney, Agent, or Firm*—Thomas W. Twomey

(57) ABSTRACT

The invention provides a steering column assembly for a vehicle. The steering column assembly includes a steering column operable to adjustably support a steering wheel in the vehicle. The steering column is moveable along a path for collapsing movement relative to a vehicle in response to an impact situation. The steering column assembly also includes an energy absorber for dissipating energy associated with the collapsing movement of the steering column along the path. The energy absorber includes an anvil fixedly disposed relative to one of the steering column and the path. The energy absorber also includes a strap drawable over the anvil and substantially fixedly disposed relative to the other of the steering column and the path. The steering column assembly also includes a second strap fixedly disposed relative to one of the steering column and the path for dissipating energy associated with the collapsing movement of the steering column along the path. The steering column assembly also includes at least one quick release bolt engaged with the strap to selectively release the strap relative to the other of the steering column and the path. The at least one quick release bolt engages both of the strap and the second strap.

12 Claims, 5 Drawing Sheets

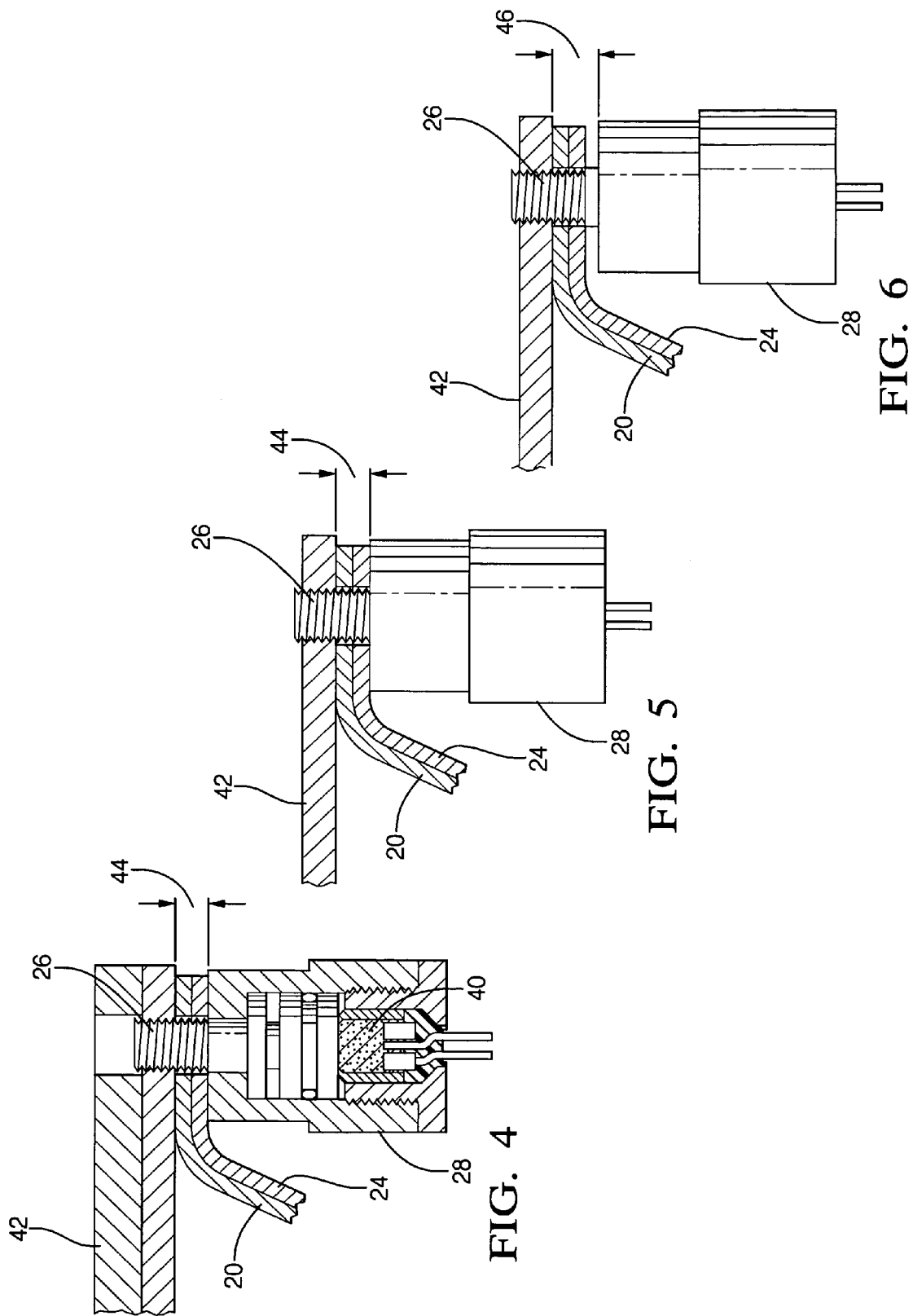

ADAPTIVE ENERGY ABSORBER FOR STEERING COLUMN

CROSS-REFERENCE TO RELATED APPLICATION

The instant application claims priority to U.S. Provisional Patent Application Ser. No. 60/686,472, filed Jun. 1, 2005, the entire specification of which is expressly incorporated herein by reference.

FIELD OF THE INVENTION

The invention relates generally to an energy absorber for steering column and more particularly to an energy absorber operable to absorb different amounts of energy associated with collapsing movement of the steering column.

BACKGROUND OF THE INVENTION

Steering column assemblies for vehicles often include kinetic energy absorption devices that act to control the collapse of the column in the event of a crash to reduce the likelihood of injury to the driver. One form of an energy absorbing device comprises a metal strap that is bent and drawn over an anvil to absorb kinetic energy of a collapsing column. Examples of energy absorbing devices include U.S. Pat. Nos. 5,605,352; 5,720,496; 6,170,874; 6,189,929; 6,322,103; 6,450,532; 6,652,002; 6,659,504; 6,749,222; 6,761,376; 6,802,536; and 6,877,775.

However, there still exists a need for new and improved energy absorbing devices for vehicle steering column assemblies.

SUMMARY OF THE INVENTION

In accordance with the general teachings of the present invention there is provided a steering column assembly for a vehicle. The steering column assembly includes a steering column operable to adjustably support a steering wheel in the vehicle. The steering column is moveable along a path for collapsing movement relative to a vehicle in response to an impact situation. The steering column assembly also includes an energy absorber for dissipating energy associated with the collapsing movement of the steering column along the path. The energy absorber includes an anvil fixedly disposed relative to one of the steering column and the path. The energy absorber also includes a first strap drawable over the anvil and substantially fixedly disposed relative to the other of the steering column and the path. The steering column assembly also includes a second strap fixedly disposed relative to one of the steering column and the path for dissipating energy associated with the collapsing movement of the steering column along the path. The steering column assembly also includes at least one quick release bolt engaged with the first strap to selectively release the first strap relative to the other of the steering column and the path. The at least one quick release bolt engages both of the first strap and the second strap.

In accordance with a first embodiment of the present invention, a steering column assembly for a vehicle is provided, comprising:

(A) a steering column operable to adjustably support a steering wheel in the vehicle and moveable along a path for collapsing movement relative to a vehicle in response to an impact situation;

(B) an energy absorber for dissipating energy associated with the collapsing movement of the steering column along the path and including an anvil fixedly disposed relative to one of the steering column and the path and a first strap drawable over the anvil and substantially fixedly disposed relative to the other of the steering column and the path;

(C) a second strap fixedly disposed relative to one of the steering column and the path for dissipating energy associated with the collapsing movement of the steering column along the path; and (D) at least one quick release bolt engaged with the first strap to selectively release the first strap relative to the other of the steering column and the path, wherein the at least one quick release bolt engages both of the first strap and the second strap.

In accordance with one aspect of the present invention, the at least one quick release bolt is further defined as being incendiary. Additionally, the at least one quick release bolt is further defined as including a shank portion and a head portion moveably engaged with the shank portion.

In accordance with another aspect of the present invention, the first strap includes a slot and the at least one quick release bolt is further defined as engaging the slot. Additionally, the slot is further defined as an open slot.

In accordance with still another aspect of the present invention, a second anvil is operably associated with said anvil, wherein either the first strap or the second strap is threadedly disposed through the anvil and the second anvil.

In accordance with still yet another aspect of the present invention, an area defining an aperture is formed in the second strap and the at least one quick release bolt is further defined as engaging the aperture. Additionally, the slot and the aperture are coaxially aligned.

In accordance with a further aspect of the present invention, either the first strap or the second strap includes a J-shaped portion formed therein. Additionally, the at least one quick release bolt is further defined as engaging a slot or an area defining an aperture formed in either of the J-shaped portions of the first strap or the second strap.

In accordance with a second embodiment of the present invention, a steering column assembly for a vehicle is provided, comprising:

(A) a steering column operable to adjustably support a steering wheel in the vehicle and moveable along a path for collapsing movement relative to a vehicle in response to an impact situation;

(B) an energy absorber for dissipating energy associated with the collapsing movement of said steering column along the path and including an anvil fixedly disposed relative to one of the steering column and the path and a first strap drawable over the anvil and substantially fixedly disposed relative to the other of the steering column and the path;

(C) a second strap fixedly disposed relative to one of the steering column and the path for dissipating energy associated with the collapsing movement of the steering column along the path; and (D) at least one quick release bolt engaged with the first strap to selectively release the first strap relative to the other of said steering column and the path, wherein the at least one quick release bolt engages both of the first strap and the second strap;

wherein the at least one quick release bolt is further defined as being incendiary.

In accordance with a third embodiment of the present invention, a steering column assembly for a vehicle is provided, comprising:

(A) a steering column operable to adjustably support a steering wheel in the vehicle and moveable along a path for collapsing movement relative to a vehicle in response to an impact situation;

(B) an energy absorber for dissipating energy associated with the collapsing movement of the steering column along the path and including an anvil fixedly disposed relative to one of the steering column and the path and a first strap drawable over the anvil and substantially fixedly disposed relative to the other of the steering column and the path;

(C) a second strap fixedly disposed relative to one of the steering column and the path for dissipating energy associated with the collapsing movement of the steering column along the path; and (D) at least one quick release bolt engaged with the first strap to selectively release the first strap relative to the other of the steering column and the path, wherein the at least one quick release bolt engages both of the first strap and the second strap;

wherein the at least one quick release bolt is further defined as being incendiary;

wherein the at least one quick release bolt is further defined as including a shank portion and a head portion moveably engaged with the shank portion;

wherein the first strap includes a slot and the at least one quick release bolt is further defined as engaging the slot;

wherein the slot is further defined as an open slot.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Advantages of the present invention will be readily appreciated as the same becomes better understood by reference to the following detailed description when considered in connection with the accompanying drawings wherein:

FIG. 4 is cross-sectional view of a quick release bolt associated with the first exemplary embodiment of the invention;

FIG. 5 is a side view of the quick release bolt shown in FIG. 4 before the quick release bolt has been activated;

FIG. 6 is a second side view of the quick release bolt shown in FIGS. 4 and 5 after the quick release bolt has been activated;

The same reference numerals refer to the same parts throughout the various Figures.

DETAILED DESCRIPTION OF THE INVENTION

Figure 1:
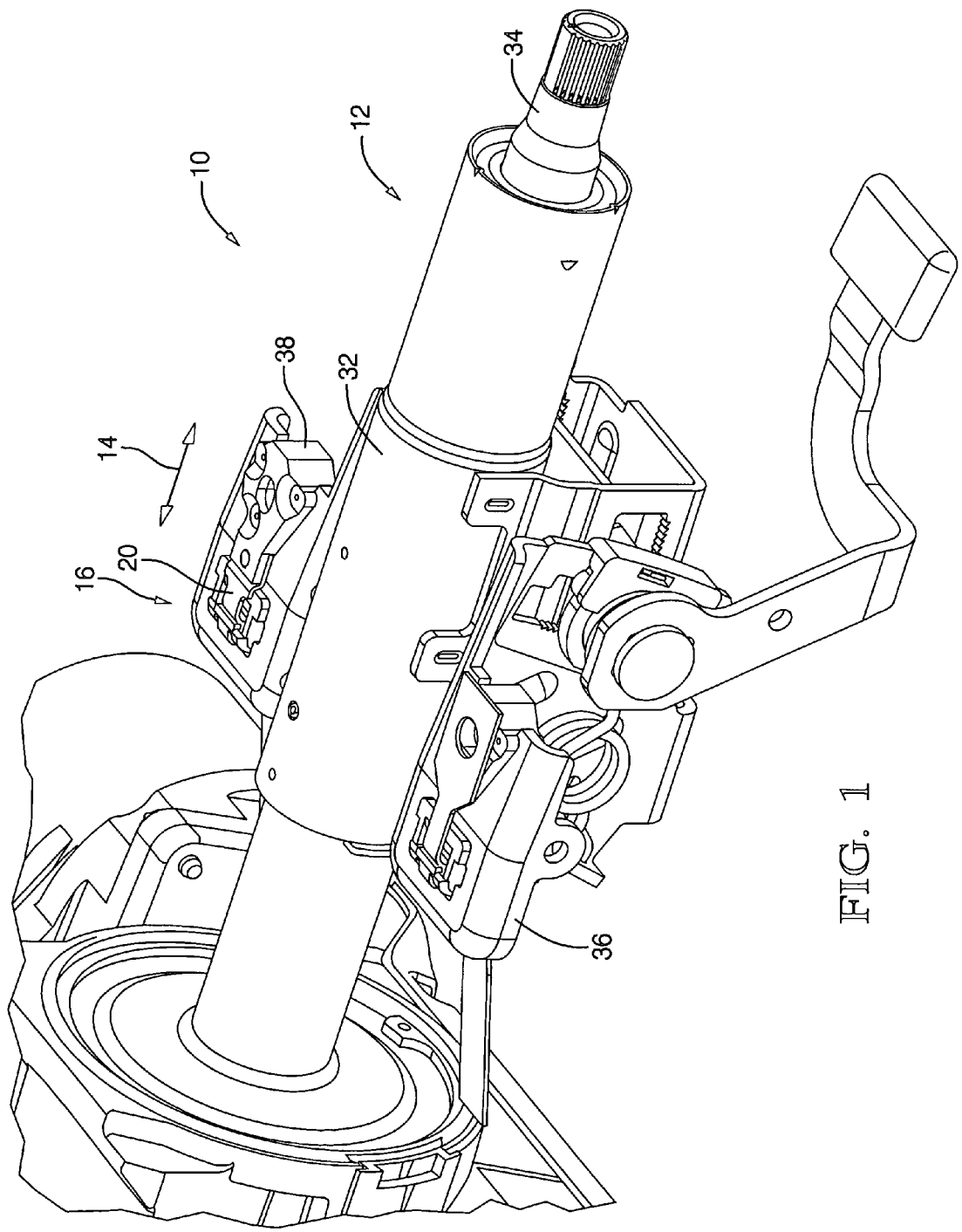
FIG. 1 is a perspective view of a first exemplary embodiment of the invention.
Figure 2:
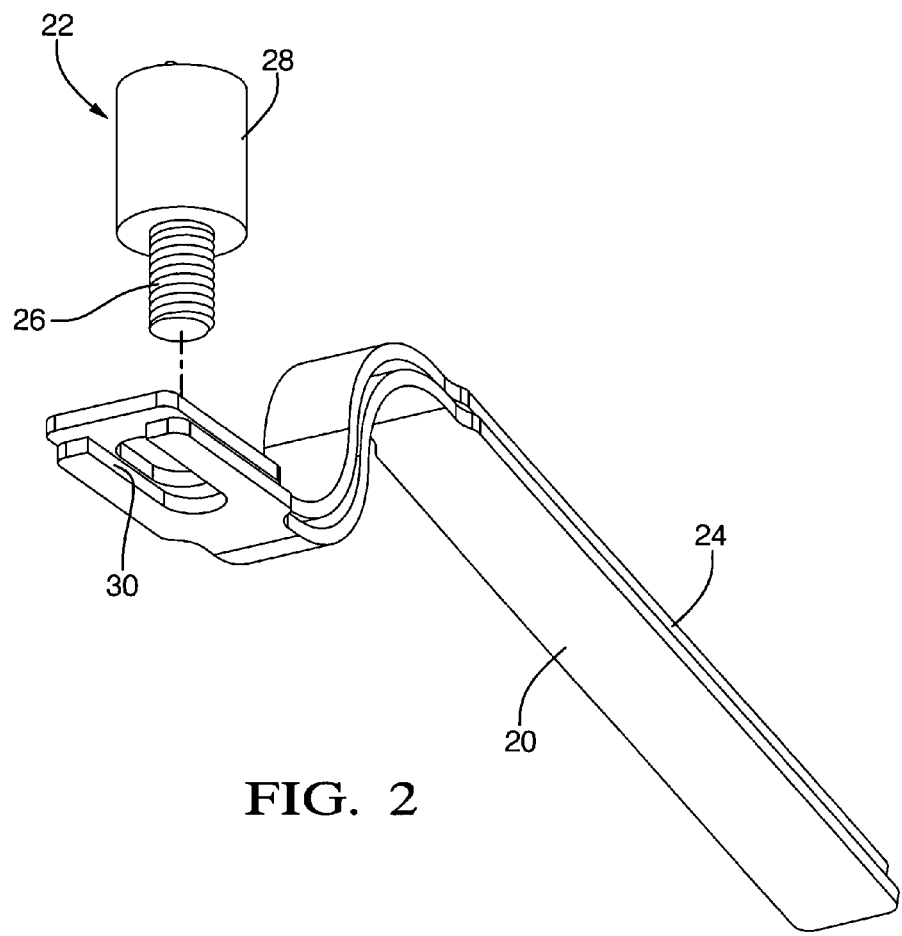
FIG. 2 is an exploded view of a strap and release bolt associated with the first exemplary embodiment of the invention.
Figure 3:
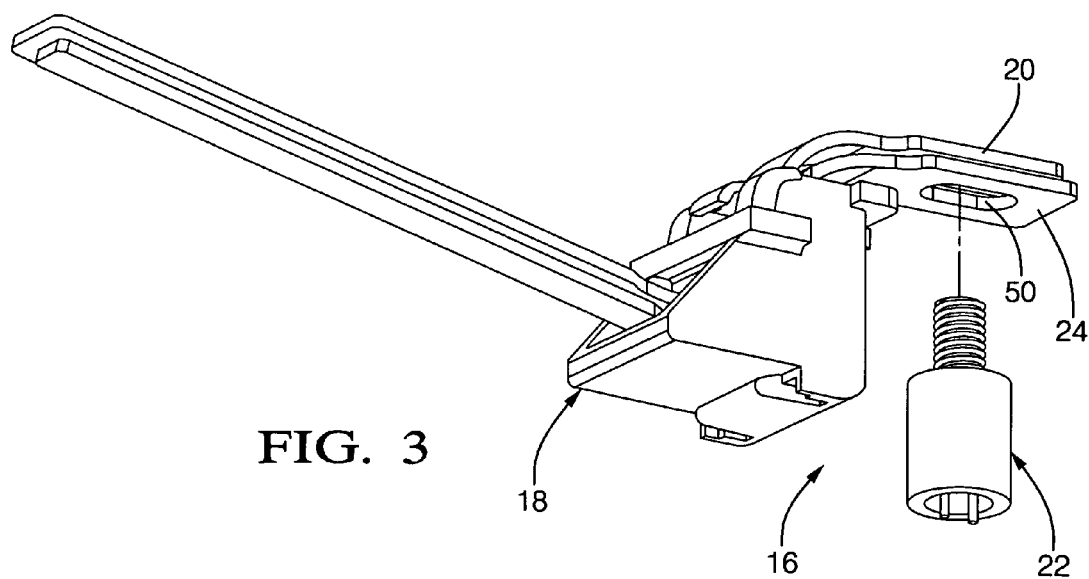
FIG. 3 is a perspective view of an energy absorber associated with the first exemplary embodiment of the invention.

A plurality of different embodiments of the invention is shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIGS. 1-4, a steering column assembly 10 for a vehicle includes a steering column 12 operable to adjustably support a steering wheel in the vehicle. The steering column assembly 10 is moveable along a path 14 for collapsing movement relative to a vehicle in response to an impact situation. The steering column assembly 10 also includes an energy absorber 16 for dissipating energy associated with the collapsing movement of the steering column 12 along the path 14. The energy absorber 16 includes an anvil 18 fixedly disposed relative to the steering column 12. The energy absorber 16 also includes a strap 20 drawable over the anvil 18 and substantially fixedly disposed relative to the path 14. The steering column assembly 10 also includes at least one quick release bolt 22 engaged with the strap 20 to selectively release the strap 20 relative to the other of the steering column 12 and the path 14.

The steering column assembly 10 also includes a steering column jacket 32 for encircling a steering shaft 34. A locking bracket 36 is disposed adjacent to the steering column jacket 32 along the path 14 and is moveable along the path 14 for the collapsing movement with the steering column jacket 32. The locking bracket 36 and the steering column jacket 32 can be locked together by known means during normal vehicle handling.

During normal vehicle handling, the locking bracket 36 is fixed to the vehicle with a release capsule 38 and a second, similar release capsule shown in the FIG. 1. In response to an impact situation, such as a vehicle crash, each of the quick release capsules 38 separates from the locking bracket 36. As a result, the locking bracket 36 moves with the steering column 12 during collapsing movement along the collapse path 14.

During normal vehicle handling, the quick release bolt 22 fixes one end of the strap 20 to the vehicle. The one end of the strap 20 is thus fixed to the collapse path 14. In response to an impact situation, such as a vehicle crash, the strap 20 can be drawn over the anvil 18 to dissipate energy. The exemplary anvil 18 will move with the steering column 12 along the path 14. However, it may be desirable to prevent energy from being dissipated by drawing the strap 20 over the anvil 18. For example, other energy absorbing structures may be present to dissipate a desired quantity of energy, such as the second strap 24. The bolt 22 includes a shank portion 26 and a head portion 28 and, in such a situation, the head portion 28 can move relative to the shank portion 26.

As best shown in FIGS. 4-6, an incendiary or explosive charge can be disposed at least partially in the head portion 28. The exemplary bolt 22 is incendiary such that when an internal charge 40 is fired, the head portion 28 can move relative to the shank portion 26. Prior to firing the charge, the shank portion 26 and a head portion 28 are substantially fixed relative to one another. The unfired bolt 22 can be threadingly engaged with a vehicle structure 42. The strap 20 and strap 24 can be pressed between the structure 42 and the head portion 28 such that the strap 20 is fixed relative to the head portion 28 and will be drawn over the anvil 18 during collapsing movement of the steering column 12 along the collapse path 14. A first distance 44 is defined between the structure 42 and the head portion 28 before the bolt 22 is fired. During an impact situation, the controller of the energy absorber 16 may determine that the strap 24 will dissipate the desired quantity of energy. In such a situation, the bolt 22 can be fired. A second distance 46 greater than the first distance 44 is defined between the structure 42 and the head portion 28 after the bolt 22 is fired. When the bolt 22 is fired, the pressing force acting on the strap 20 diminishes.

The strap 20 includes an open slot 30. The shank portion 26 is received in the slot 30. When the bolt 22 is fired, the strap 20 can move with the steering column or be fixed to the path, wherein the strap 20 will not dissipate energy. The bolt 22 will move out of the slot 30 or the strap 20 will move away from the bolt 22. The strap 24 includes an aperture 50. The shank portion 26 is received in the aperture 50. Before and after the bolt 22 has been fired the shank portion 26 will cooperate with the aperture 50 such that the strap 24 will be drawn over the anvil 18 or another anvil.

The exemplary bolt 22 can be acquired from Special Devices, Inc., of Mesa, Ariz. While the bolt 22 has been described as incendiary, an alternative form of the bolt could be a solenoid-like with a pin operable to extend into and retract from a hole defined by the strap 20. Also, while the straps 20 and 24 have been shown to be substantially the same size and have a substantially constant cross-section, differently sized straps can be used together in alternative embodiments of the invention as well as straps having variable cross-sections.

Figure 7:
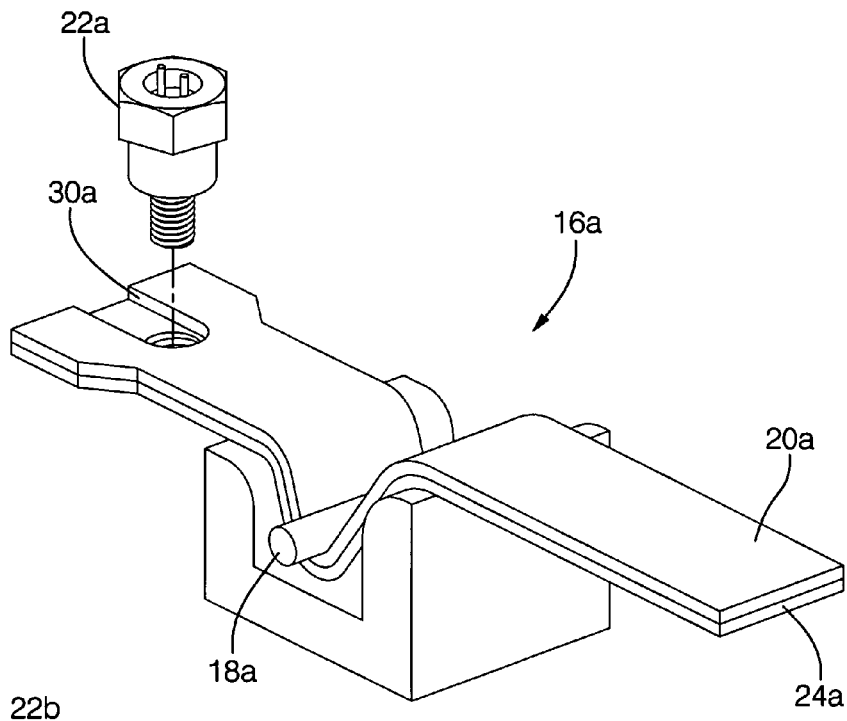
FIG. 7 is a perspective view of a first alternative energy absorber.

Referring now to FIG. 7, a first alternative energy absorber 16a includes straps 20a, 24a and an anvil 18a. The strap 20a includes a slot 30a receiving a bolt 22a.

Figure 8:
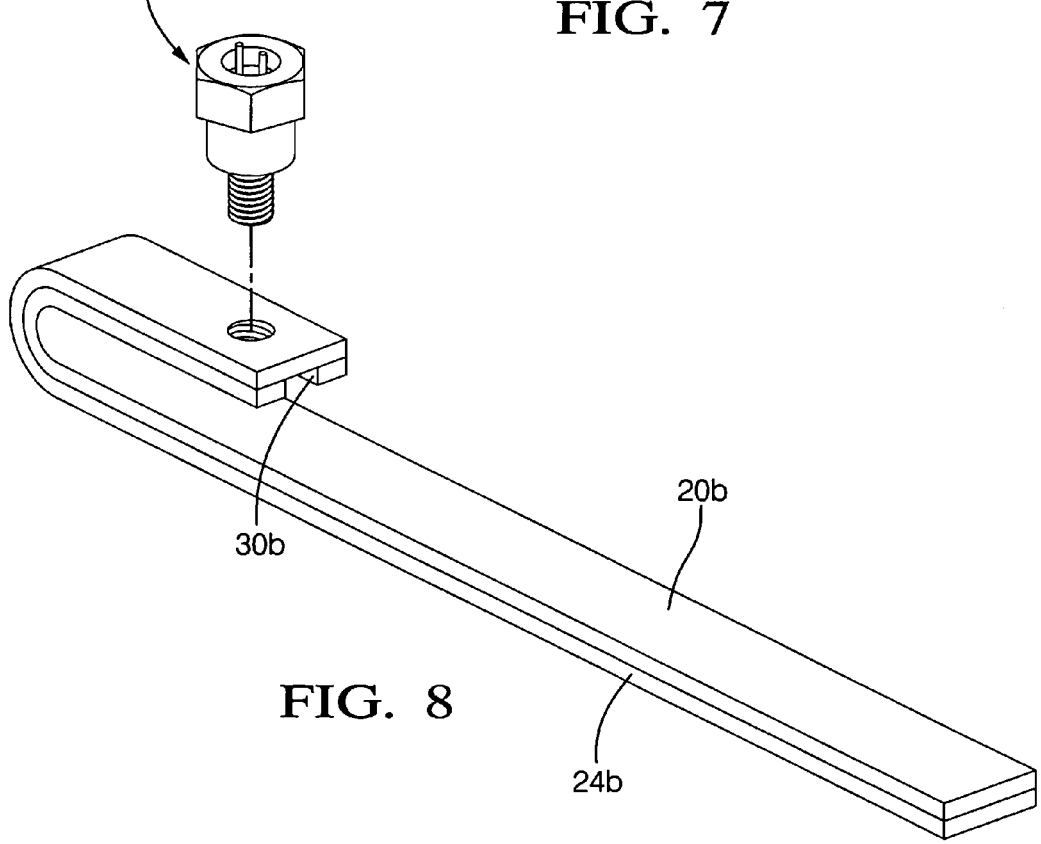
FIG. 8 is a perspective view of an alternative strap arrangement.

Referring now to FIG. 8, an alternative pair of straps 20b, 24b can include a J-shaped portion. The strap 20b includes an open slot 30b receiving a bolt 22b. The strap 24b can also include an area defining an aperture (e.g., similar to element 50 depicted in FIG. 3) that is operable to receive the bolt 22b. For example, the open slot 30b and the aperture can be coaxially aligned such that both the open slot 30b and the aperture of the respective straps can simultaneously receive the bolt 22b.

Figure 9:
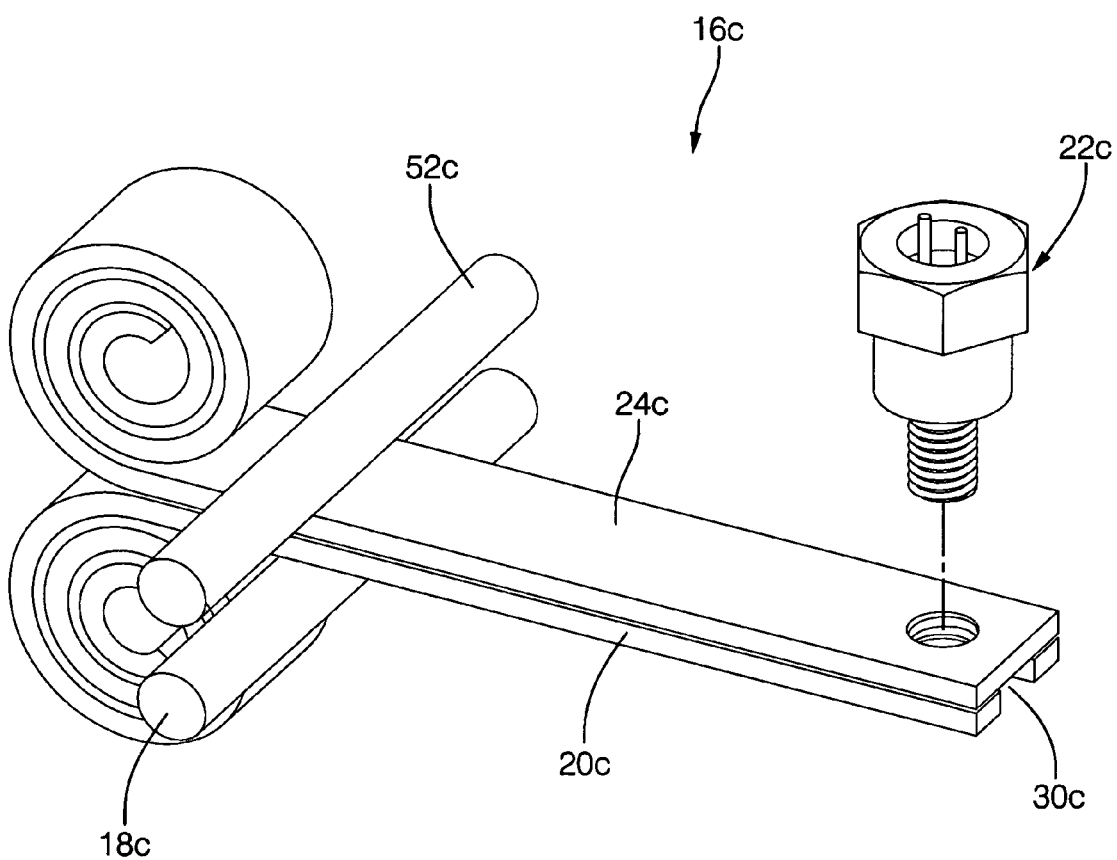
FIG. 9 is a perspective view of a second alternative energy absorber.

Referring now to FIG. 9, a second alternative energy absorber 16c includes straps 20c, 24c and an anvil 18c. The strap 20c includes an open slot 30c receiving a bolt 22c. Either or both strap 20c and/or strap 24c are drawable over a second anvil 52c, e.g., threadedly disposed through anvil 18c and anvil 52c. Additionally, a portion of either or both strap 20c and/or strap 24c can be provided with a coiled portion in proximity to either or both anvil 18c and/or anvil 52c.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for a vehicle, comprising:
    a steering column operable to adjustably support a steering wheel in the vehicle and moveable along a path for collapsing movement relative to a vehicle in response to an impact situation;
    an energy absorber for dissipating energy associated with said collapsing movement of said steering column along said path and including an anvil fixedly disposed relative to one of said steering column and said path and a first strap drawable over said anvil and substantially fixedly disposed relative to the other of said steering column and said path, the first strap having a first side and a second side, the first strap having an open slot at one end, the energy absorber also including a second strap fixedly disposed relative to one of said steering column and said path for dissipating energy associated with said collapsing movement of said steering column along said path, the second strap having a first side and a second side and an aperture at one end, the first side of the second strap being positioned adjacent the second side of the first strap; and
    at least one quick release bolt having a shank portion and a head portion, the shank portion being fixedly coupled to a structure of the vehicle, the at least one quick release bolt having an engaged position in which the head portion and the structure have a first distance therebetween and a released position in which the head portion and the structure have a second distance therebetween, the second distance being greater than the first distance, the shank portion being located through the aperture of the second strap such that the shank portion is engaged with said second strap when the at least one quick release bolt is in the engaged position and in the released position, the shank portion being engaged with said first strap to selectively release said first strap such that the first strap is clamped between the head portion and the structure of the vehicle when the at least one quick release bolt is in the engaged position and the first strap is released with respect to the vehicle when the at least one quick release bolt is in the released position.

2. The steering column assembly of claim 1, wherein said at least one quick release bolt is further defined as being incendiary.

3. The steering column assembly of claim 1, further comprising a second anvil operably associated with said anvil, wherein either said first strap or said second strap is threadedly disposed through said anvil and said second anvil.

4. The steering column assembly of claim 1, wherein said slot and said aperture are coaxially aligned.

5. The steering column assembly of claim 1, wherein either said first strap or said second strap includes a J-shaped portion formed therein.

6. The steering column assembly of claim 5, wherein said at least one quick release bolt is further defined as engaging a slot or an area defining an aperture formed in either of said J-shaped portions of said first strap or said second strap.

7. A steering column assembly for a vehicle, comprising:
    a steering column operable to adjustably support a steering wheel in the vehicle and moveable along a path for collapsing movement relative to a vehicle in response to an impact situation;
    an energy absorber for dissipating energy associated with said collapsing movement of said steering column along said path and including an anvil fixedly disposed relative to one of said steering column and said path and a first strap drawable over said anvil and substantially fixedly disposed relative to the other of said steering column and said path, the first strap having a first side and a second side, the first strap having an open slot at one end, the energy absorber also including a second strap fixedly disposed relative to one of said steering column and said path for dissipating energy associated with said collapsing movement of said steering column along said path, the second strap having a first side and a second side and an aperture at one end, the first side of the second strap being positioned adjacent the second side of the first strap; and at least one quick release bolt having a shank portion and a head portion, the shank portion being fixedly coupled to a structure of the vehicle, the at least one quick release bolt having an engaged position in which the head portion and the structure have a first distance therebetween and a released position in which the head portion and the structure have a second distance therebetween, the second distance being greater than the first distance, the shank portion being located through the aperture of the second strap such that the shank portion is engaged with said second strap when the at least one quick release bolt is in the engaged position and in the released position, the shank portion being engaged with said first strap to selectively release said first strap such that the first strap is clamped between the head portion and the structure of the vehicle when the at least one quick release bolt is in the engaged position and the first strap is released with respect to the vehicle when the at least one quick release bolt is in the released position; wherein said at least one quick release bolt is further defined as being incendiary.

8. The steering column assembly of claim 7, further comprising a second anvil operably associated with said anvil, wherein either said first strap or said second strap is threadedly disposed through said anvil and said second anvil.

9. The steering column assembly of claim 7, wherein said slot and said aperture are coaxially aligned.

10. The steering column assembly of claim 7, wherein either said first strap or said second strap includes a J-shaped portion formed therein.

11. The steering column assembly of claim 10, wherein said at least one quick release bolt is further defined as engaging a slot or an area defining an aperture formed in either of said J-shaped portions of said first strap or said second strap.

12. An energy absorber for dissipating energy associated with a collapsing movement of a steering column relative to a structure, comprising:

an anvil;

a first strap having first and second sides and a first end and a second end, the second end of the first strap having an open slot;

a second strap having first and second sides and a first end and a second end, the second end of the second strap having an aperture, the first side of the second strap being positioned adjacent the second side of the first strap, the first and second straps being positioned with respect to the anvil such that the first and second straps are drawable over the anvil; and, at least one quick release bolt having a shank portion and a head portion, the shank portion being fixedly coupled to the structure, the at least one quick release bolt having an engaged position in which the head portion and the structure have a first distance therebetween and a released position in which the head portion and the structure have a second distance therebetween, the second distance being greater than the first distance, the shank portion being located through the aperture of the second strap such that the shank portion is engaged with said second strap when the at least one quick release bolt is in the engaged position and in the released position, the shank portion being engaged with said first strap to selectively release said first strap such that the first strap is clamped between the head portion and the structure of the vehicle when the at least one quick release bolt is in the engaged position and the first strap is released with respect to the vehicle when the at least one quick release bolt is in the released position.

* * * * *